United States Patent Office 3,395,985
Patented Aug. 6, 1968

3,395,985
METHOD FOR PRODUCING HIGHLY PURE, PARTICULARLY SILICON-FREE $A^{III}B^V$ COMPOUNDS
Hans Merkel, Erlangen, Germany, assignor to Siemens Aktiengesellschaft, Berlin, Germany
Filed June 27, 1966, Ser. No. 560,448
Claims priority, application Germany, June 25, 1965, S 97,810
5 Claims. (Cl. 23—204)

ABSTRACT OF THE DISCLOSURE

Described is a method of producing highly pure, silicon-free, crystalline $A^{III}B^V$ compounds, through chemical reaction from the elements. The method comprises forming the reaction vessel from the more volatile element. The less volatile element is placed in the reaction vessel of the more volatile element. The reaction temperature is increased from the start of the reaction process at a value above the melting point of the less volatile component, to a value up to the melting temperature of the synthesized $A^{III}B^V$ compound and subsequently pulling monocrystals of the synthesized $A^{III}B^V$ compound from the melt.

German published application 1,188,555 relates to a method for producing highly pure crystalline bodies of nitrides, phosphides or arsenides of the third main group of the periodic system. According to this method, nitrogen, phosphorus vapor or arsenic vapor reacts in a crucible with a molten element of the third main group of the Periodic Table, in such a way that the reaction product formed and the nonreacting melt are pulled upward and zone-molten by one or several solid bodies of the same or inert material.

Contact between the melt and the vessel wall and resulting impurities is avoided by maintaining a temperature gradient within the molten material in such a manner that the melt surface is at the highest temperature. According to a particularly favorable embodiment, the nonreacted mass present in the crucible is in a molten condition only at the surface, while the produced $A^{III}B^V$ compound is withdrawn.

The above method for producing highly pure $A^{III}B^V$ compounds is not suitable for commercial production, since under the specified conditions, the $A^{III}B^V$ compounds, for example indium phosphide, occurs only at the surface of the melt. After removing the indium phosphide formed and the still present melt, additional indium must be melted in. This reaction also occurs at the surface. The known method therefore, affords only a discontinuous process, is slow and is of very limited utility.

I have now found that highly pure, particularly silicon-free, crystalline $A^{III}B^V$ compounds may be produced through chemical reaction from the elements, in a simple manner. According to my method a reaction vessel is formed from the more volatile component and the less volatile component is then introduced into said vessel. A reaction takes place with the vessel in a manner such that the reaction temperature which at the start of the reaction is above the melting point of the less volatile component, increases as the reaction progresses, up to the melting temperature of the synthesized $A^{III}B^V$ compound. The crystals are subsequently pulled from the melt in a known manner. My new method is particularly advantageous when the more volatile element is arsenic and the less volatile element is gallium.

The process will be further described with reference to the drawing in which.

Figures 1, 2:
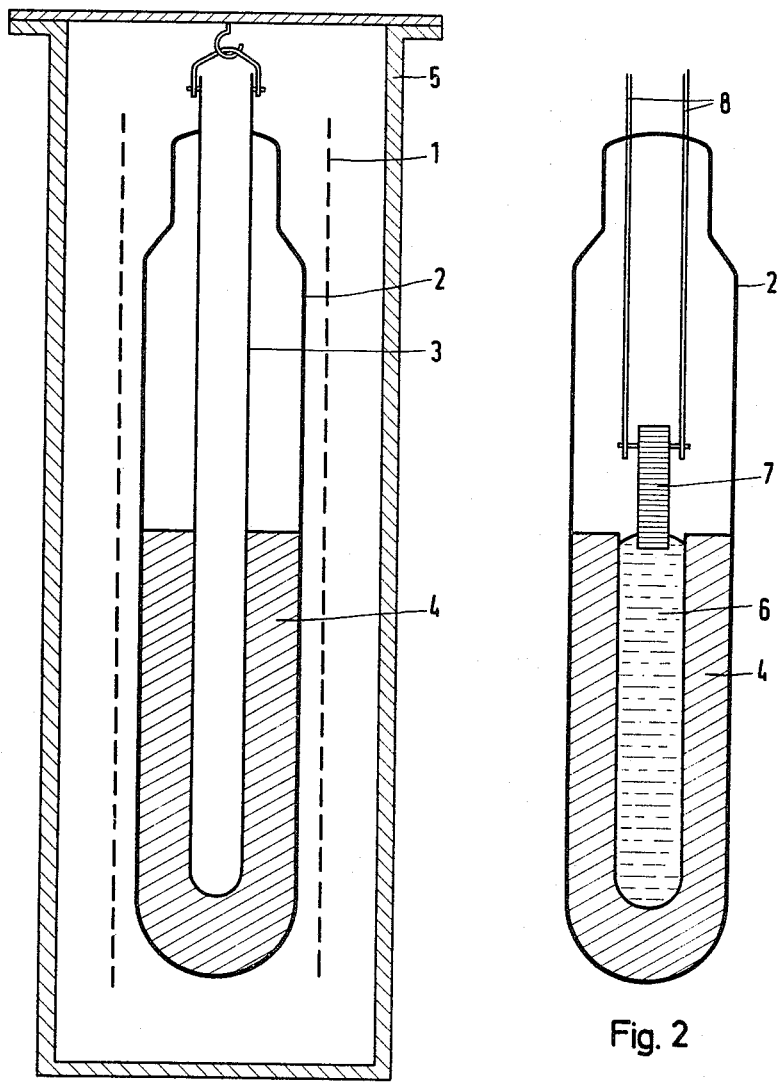
FIG. 1 shows the production of an arsenic crucible.
FIGS. 2 to 4 show the melting synthesis and the pulling of a monocrystal.

A quartz ampul 2 which contains a second, narrower, quartz ampul 3, closed at the bottom, and arsenic 4 between the two ampuls, is evacuated and suspended vertically in a furnace 1. The furnace temperature is so adjusted that the arsenic melts in the ampul, which is the case at 830° C. and 38 atmospheres. Because of the high arsenic vapor pressure, it is preferable to operate in an autoclave 5 wherein there is an appropriately high counter-pressure. After the ampul cools down, it is cut above the arsenic specimen. The narrower quartz ampul or tube is pulled up from the arsenic layer. This removal of the inner narrower quartz tube can be assisted by a slight heating of the inside arsenic layer. The crucible produced in this manner has an inner wall of arsenic and an outer wall consisting of quartz.

Figure 3:
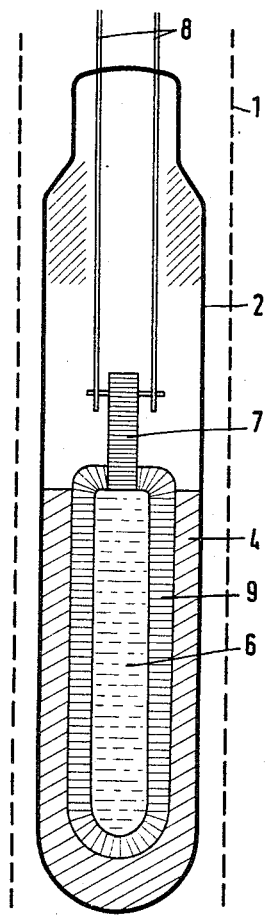
Figure 4:
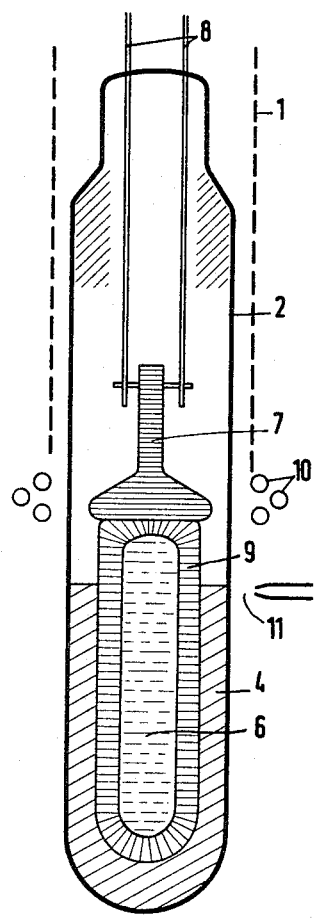

In FIG. 2, gallium 6 is next introduced into the arsenic crucible 4, which, together with a gallium arsenide seed 7, attached to a holder 8, is put into an ampul 2. The ampul is subsequently evacuated, closed and heated with the furnace 1, approximately for 3 hours, to 720° C. (FIG. 3). At this temperature, the components react markedly with each other. The gallium is thereby coated with a thick layer of gallium arsenide 9 which brings the reaction to a standstill but is, however, stable enough to maintain the not yet reacted liquid gallium located therein as a several centimeter high rod. In order to convert the entire gallium 6 into gallium arsenide, the gallium is heated above the melting point of the gallium arsenide (2140° C.). This takes place by means of the high frequency heating 10 in FIG. 4. Through an appropriate tuning of the high frequency generator, for the high frequency heating, the lower part of the gallium arsenide seed together with a narrow zone of the rod, consisting of gallium arsenide and gallium are first heated to approximately 1240° C. This produces a small zone of molten gallium arsenide which grows monocrystalline at the gallium arsenide seed located above. The high frequency coil is transported downward and the melting synthesis is moved downward at the same rate at which the molten arsenide grows at the seed and solidifies. The molten gallium arsenide does not touch the vessel wall, preventing absorption of impurities, e.g., silicon, from the vessel material. During the reaction process, the upper part of the ampul and the furnace 1, are kept at 600° C., so that the arsenic vapor pressure, necessary for the melting synthesis, is maintained at approximately 1 atmosphere. The excess arsenic located in the lower portion of the ampul will sublime upward under these conditions and precipitate on the ampul wall which is heated to 600° C. The premature vaporization, of the arsenic crucible still needed for the reaction process, due to undesirable temperature increases through heat radiation of the melting zone, is prevented by the cooling 11 of the ampul.

The method according to the invention may also be used for the production of other highly pure arsenides, phosphides and antimonides in crystalline form. For example, indium arsenide, aluminum arsenide, gallium phosphide, indium phosphide, gallium antimonide and indium antimonide may be produced in this manner.

My method is also suitable for the production of $A^{III}B^V$ rods of any desired doping. The doping substance added preferably forms a relatively high boiling point compound of the less volatile component of the third main group, but an easily vaporizing doping substance of the volatile component.

The method according to the invention makes possible the production of $A^{III}B^V$ compounds with extremely slight impurities, which are needed in particular for Laser diodes, microwave diodes, switching diodes, detectors, transistors, solar cells and other fields of utilization. A satisfactory solution was not possible in the case of many of the above fields of utilization because $A^{III}B^V$ compounds were to a large extent contaminated with silicon. For example, the production of radiation-resisting GaAs solar cells had been impossible.

I claim:

1. The method of producing highly pure, silicon-free, crystalline $A^{III}B^V$ compounds, through chemical reaction from the elements, which comprises forming the reaction vessel from the more volatile element, placing the less volatile element in the reaction vessel of the more volatile element, increasing the reaction temperature from the start of the reaction process at a value above the melting point of the less volatile component, to a value up to the melting temperature of the synthesized $A^{III}B^V$ compound and subsequently pulling monocrystals of the synthesized $A^{III}B^V$ compound from the melt.

2. The method of claim 1 wherein to form the reaction vessel from the more volatile element, an outer ampul containing an inner, narrower quartz ampul, closed at the bottom, and filled with the more volatile element between the ampuls is suspended, after evacuation, vertically in a furnace whereby the more volatile element melts, cooling the ampul and contents, cutting off the top of the outer quartz ampul and removing the inner quartz ampul.

3. The method of claim 2, wherein arsenic is the more volatile component.

4. The method of claim 2, wherein gallium is used as the less volatile component.

5. The method of claim 2, wherein gallium arsenic is formed by arsenic as the more volatile component and gallium as the less volatile component.

References Cited

UNITED STATES PATENTS 3,077,384   2/1963   Enk et al. _____ 23—204

OSCAR R. VERTIZ, *Primary Examiner.*

H. S. MILLER, *Assistant Examiner.*